Patented Sept. 15, 1925.

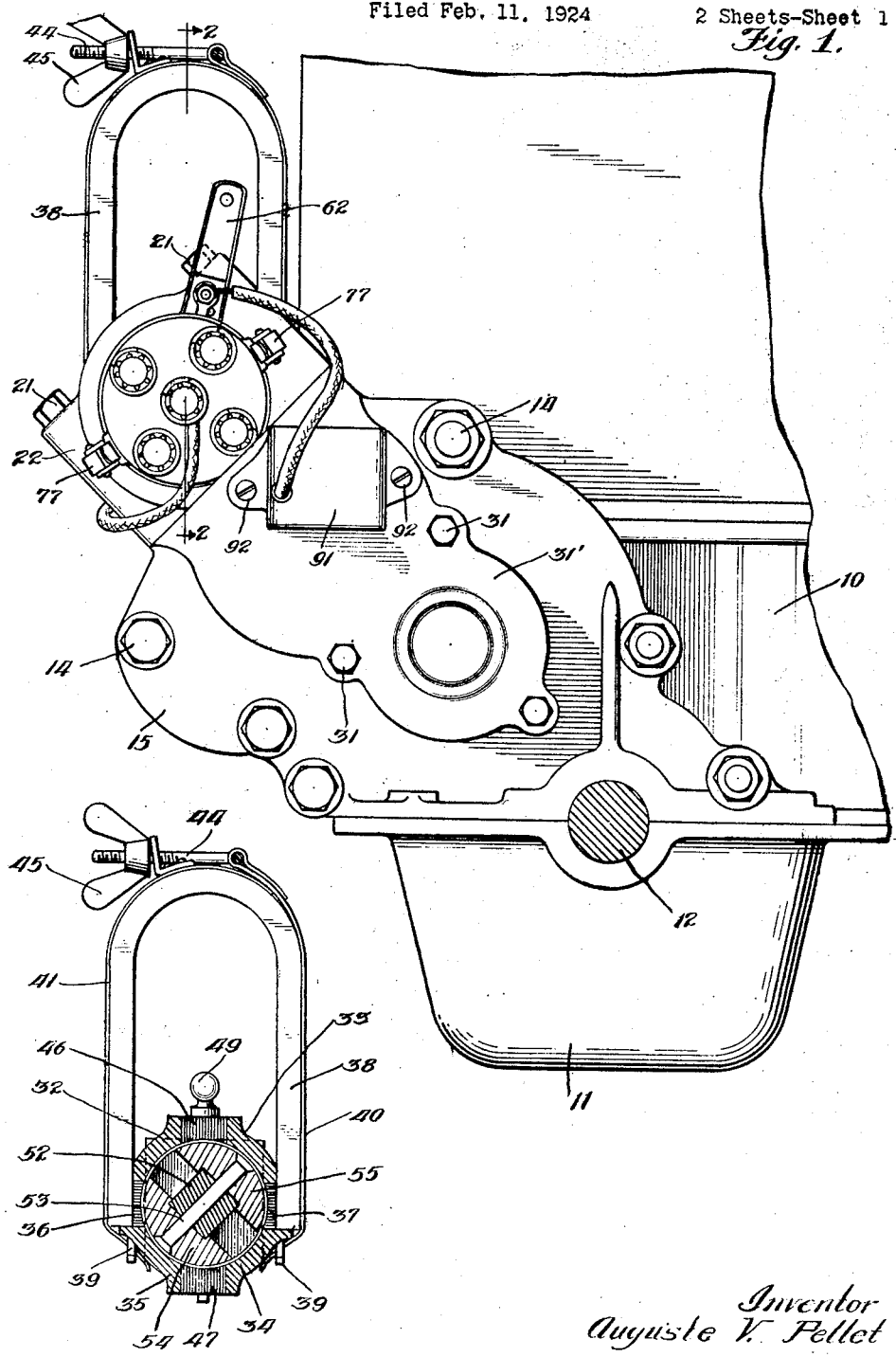

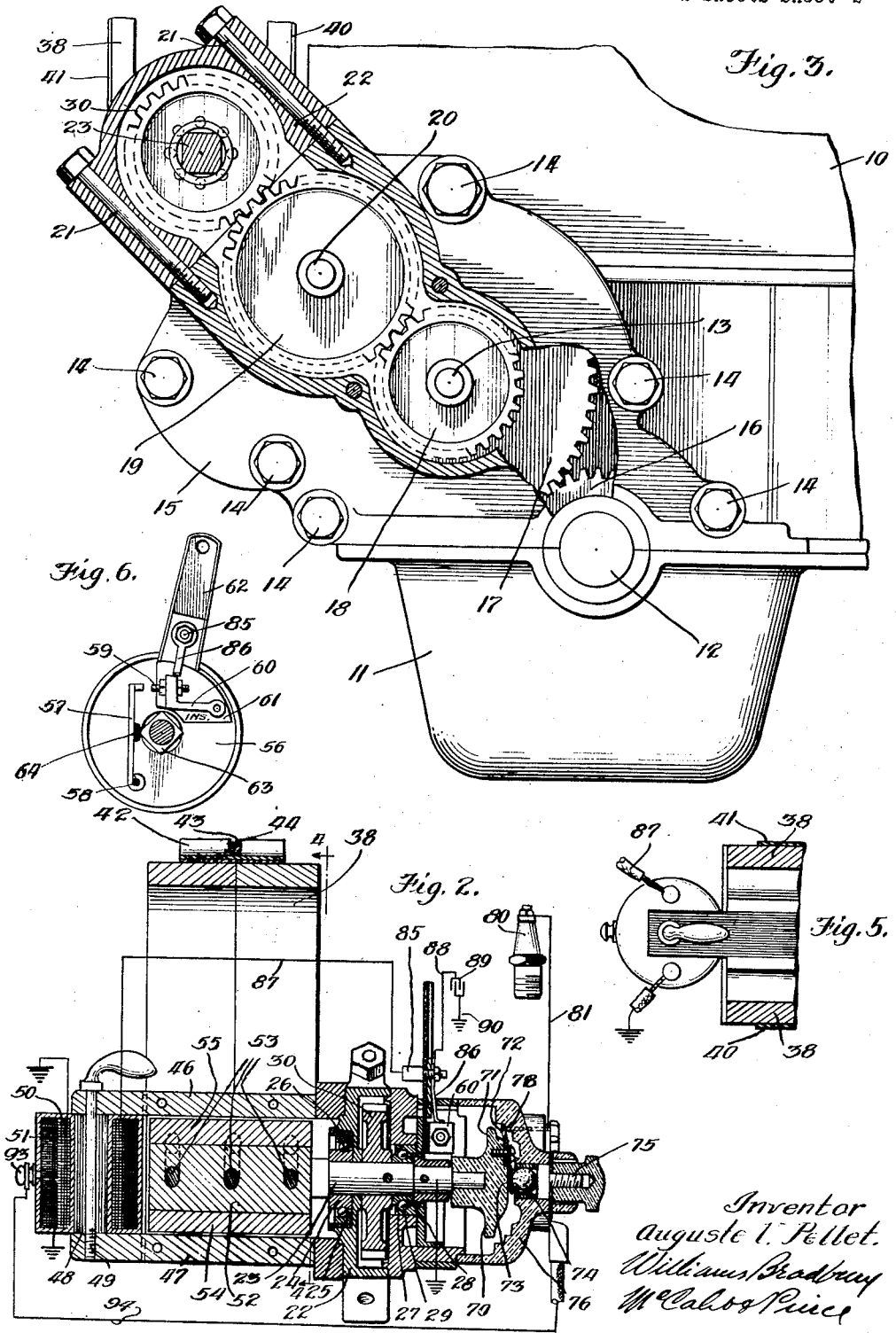

1,553,714

UNITED STATES PATENT OFFICE.

AUGUSTE V. PELLET, OF CHICAGO, ILLINOIS.

IGNITION APPARATUS.

Application filed February 11, 1924. Serial No. 692,163.

*To all whom it may concern:*

Be it known that I, AUGUSTE V. PELLET, a citizen of the United States, and resident of Chicago, in the county of Cook and State of Illinois, have invented a certain new and useful Improvement in Ignition Apparatus, of which the following is a full, clear, concise, and exact description, reference being had to the accompanying drawings, forming a part of this specification.

This invention relates to ignition apparatus and particularly to ignition apparatus for automobiles.

Automobiles of a certain kind are provided at the forward end of the engine with a cover plate, upon the removal of which access may be had to certain parts of the engine.

It is the object of the present invention to provide a complete ignition equipment which may be mounted upon a plate similar to the cover plate above referred to, and which may be substituted for said cover plate.

It is a further object of the invention to provide ignition equipment of this character which will be exceedingly simple and durable in construction, and which will be easily accessible for any necessary adjustment or repairs.

It is believed the invention will be understood most readily from a detailed description thereof taken in connection with the accompanying drawings, in which Figure 1 is view looking at the lower right forward corner of the automobile motor;

Figure 2 is a section taken substantially on the line 2—2 of Figure 1;

Figure 3 is a view looking at the same part of the equipment as in Figure 1, but with the distributor and interrupter mechanism removed;

Figure 4 is a section substantially on the line 4—4 of Figure 2;

Figure 5 is a view looking at the upper end of the induction coil and adjacent parts, and Figure 6 is a view of the interrupter mechanism detached.

Referring now to the drawings, in which like reference characters indicate the same parts in the several views, 10 indicates the motor frame, 11 the sump pan, 12 the crank shaft, and 13 the cam shaft. Secured to the lower right corner of the engine frame 10, by means of the cap screws 14, is a cover plate 15 which may be very similar to the cover plate originally provided on motors of the type herein shown.

Fixed to the shaft 12 is a gear 16 which meshes with the gear 17 fixed to the cam shaft 13. These gears are so proportioned that the cam shaft 13 will make one revolution for each two revolutions of the crank shaft 12.

Fixed to the cam shaft 13 is a gear 18 which meshes with the gear 19 pivotally supported on the pin or screw 20 carried by the cover plate 15. Secured to the cover plate 15, by means of the cap screws 21, is a frame or support 22 through which extends the shaft 23. The shaft 23 is mounted in the frame 22 by means of two sets of ball bearings, one set consisting of the inner ball raceway 24, and outer ring 25, having the balls 26 therebetween, the other bearing comprising the inner raceway 27, outer ring 28 and balls 29. It will be noted that the ball bearings are so arranged that the shaft 23 is not only rotatably mounted, but is held against longitudinal movement by means of the bearings.

Rigidly fixed to the shaft 23 between the ball bearings is a gear 30 which, when the mechanism is assembled, meshes with the gear 19 carried on the stub shaft 20. It should be understood that the gear 19 is merely an idler gear and transmits motion from the cam shaft 13 to the magneto and distributor shaft 23, the gears being so proportioned and arranged that the shaft 23 will rotate in exact synchronism with the cam shaft.

Secured to the cover plate 15, by means of the cap screws 31, is a second cover plate 31' which overlies the gears 18 and 19.

Extending laterally from one side of the frame 22 in which the bearings are mounted is the magneto frame which comprises the non-magnetic members 32, 33, 34 and 35 provided with a cylindrical bore in which the rotor of the magneto is positioned. Between the adjacent sides of the supporting members 32, 35, and 33, 34 respectively are the pole pieces 36 and 37 of the permanent magnet 38. The lower ends of the magnet 38 rest against shoulders provided on the frame members 34 and 35 and in contact with the pole pieces 36 and 37. Extending downwardly from the frame members 36 and 37 are the pins or lugs 39 adapted to extend through openings in the cover and retaining strips 40 and 41. The upper end of the strip 41 is provided with an upwardly extending flange 42 having a notch 43 through which extends the bolt 44. The end of the bolt 44 is pivotally secured to the upper end of the cover strip 40, in any desired manner. Thus, the bolt 44 may be rotated so as to position it within the slot 43, when, by turning the butterfly nut 45, the parts may be clamped firmly together. Upon loosening the nut 45, the cover strips 40 and 41 may be readily removed, thus permitting the magnet 38 to be lifted out.

Arranged between the frame members 32, 33 and 34, 35 respectively are the pole pieces 46 and 47 of the transformer core. These pole pieces extend substantially parallelly as seen in Figure 2, a connecting member 48 being joined to the left ends thereof by means of the screw or bolt 49. It is to be understood that the pole pieces 36, 37, 46, 47 and the connecting member 48 will preferably be made of laminations in a well known manner.

Positioned about the connecting member 48 is the primary coil 50 and the secondary coil 51. Integral with the shaft 23 or rigidly fixed thereto and extending between the pole pieces 36, 37, 46, 47 is a square shaft 52 to which is secured, by means of the rivets 53, the inductor segments 54 and 55.

Rotatably mounted about the right end of the shaft 23, as seen in Figure 2, is the plate 56 on which the interrupter contacts are mounted. The movable contact 57 is rotatably supported on the pin 58 carried by the plate or disc 56. The adjustable contact 59 is screw threaded through the member 60 which is mounted on the block 61 of insulating material secured to the disc 56, in any desired manner. The disc or plate 56 is provided with the upwardly directed handle 62, by means of which the disc may be rotated about the shaft 23 in order to advance or retard the spark.

Secured to the shaft 23, in any desired manner, is the generally rectangular interrupter cam 63, which, upon rotation of the shaft 23, is adapted to engage the block 64 of insulating material fixed to the breaker arm 57 and cause the contact 65 to move out of engagement with the contact 59. As the cam 63 is substantially rectangular, the contacts 59 and 65 will be separated four times for each revolution of the shaft 23, which, it will be remembered, rotates in synchronism with the cam shaft 13. Fixed to the shaft 23 to the right of the interrupter cam 63, in the usual or any desired manner, is the insulating block 70 to which is secured, by means of the screw 71, the brushes 72 and 73. Brush 73 is arranged to make constant contact with the ball or knob 74 electrically connected to the binding post 75 which is mounted centrally of the distributor cap 76. The cap 76 is maintained in its operative position in the usual or any desired manner, as by means of the catches 77 (see Figure 1). The brush 72 is arranged to wipe over in succession the contacts 78 mounted in the distributor head 76. Each of the contacts 78 is joined to its respective spark plug 80, only one of which is shown, by means of the usual conductor 81.

Carried by the arm or lever 62 is a binding post 85 which is joined through the conducting element 86 to the bracket member 60 and, therefore, to the adjustable contact 59. The binding post 85 is joined through conductor 87 to one end of the primary coil 50, the other end of the coil being grounded as indicated in Figure 2. Conductor 88 is joined at one end to the binding post 85, the other end being joined to one side of the condenser 89. The other side of the condenser is grounded, as indicated at 90. The condenser 89 is positioned within the cover cap 91 fixed to the plate 31' by means of the screws 92. The binding post 75 in the distributor head is joined to the contact lug 93 which forms one terminal of the secondary winding 50 by means of the conductor 94, the other terminal of the secondary coil 51 being grounded to the frame of the apparatus in any desired manner.

The operation of the device is as follows:

As the crank shaft 12 of the engine rotates, the cam shaft 13, and consequently the shaft 23 of the ignition apparatus, will be driven. As the inductor segments 54 and 55 are rotated between the pole pieces 37, 46, 36 and 47, they will act alternately to join the pole pieces 36 and 37 to the core pole pieces 46 and 47. The rotation of the inductor elements will cause the lines of force through the core structure to be reversed for every quarter revolution of the shaft 33, thus tending to set up current in the primary coil 50. The mounting plate 56 carrying the interrupter contacts will be so adjusted through the medium of the arm 62 that the interrupter contacts will be separated at the instant when it is desired to supply a spark to a spark plug. When the break in the primary coil circuit occurs, a high potential impulse will be set up in the secondary coil. The ungrounded end of the secondary coil being joined to the distributor brush 72 through contact 93, conductor 94, binding post 75, ball 74 and brush 73, the high potential impulse will be conveyed to the distributor brush which at this time will be in operative relation to one of the contacts 78 which is joined to its respective spark plug through the medium of a conductor 81. As there is nothing peculiar or novel in the particular manner of operation of the magneto herein shown, it is believed further description of its operation need not be given.

It will be noted from an inspection of the drawings and from the above description that the entire magneto structure, except for the condenser 91, is carried by the frame members 22 which are secured to the mounting plate 15 by means of the cap screws 21. Thus, if it is desired to remove the distributor unit for repair or replacement, all that is necessary is to remove the distributor cap 76, unsnap the end of conductor 94 from the terminal button 93 in the usual manner, disconnect conductor 88 from binding post 85, take out the screws 21 and remove the ignition unit from the engine.

It will further be noted that all the movable elements of the ignition apparatus are mounted on the shaft 23, the interrupter and distributor being on one side of the ball bearings, and the rotor of the magneto being on the other side. The gear 30, by means of which the shaft 23 is driven, is mounted substantially centrally between the rotor one one side and the interrupter and distributor on the other, and the ball bearings above referred to are positioned on opposite sides of the gear 30. As the ball bearings are mounted on opposite sides of the gear 30, the stresses incident to rotating the shaft 30 are distributed between the bearings and vibration of the shaft is prevented. It will further be noted that the arrangement herein provided is exceedingly compact, permitting it to be inserted where the space is exceedingly limited.

Having thus described my invention, what I claim is:—

1. In ignition apparatus for gas engines, a shaft, a gear fixed to said shaft, a housing for said gear bearings for said shaft mounted in said gear housing, a magneto rotor carried by said shaft at one side of said gear housing, and distributor mechanism associated with said shaft on the other side of said gear housing.

2. In ignition apparatus for gas engines, a shaft, a driving gear fixed to said shaft, a housing for said gear bearings for said shaft mounted in said gear housing, a magneto rotor carried by said shaft at one side of said gear housing, and interrupter and distributor mechanism associated with said shaft on the other side of said gear housing.

3. In ignition apparatus for gas engines, a shaft, a gear fixed to said shaft intermediate the ends thereof, a housing for said gear, bearings in said housing for said shaft on opposite sides of said gear, a magneto rotor carried by said shaft on one side of said gear housing, and distributor mechanism associated with said shaft on the other side of said gear housing.

4. In ignition apparatus for gas engines, a shaft, a gear fixed to said shaft intermediate the ends thereof, two bearings for said shaft on opposite sides of said gear and adajacent thereto, a magneto rotor carried by said shaft on one side of said gear and bearings said rotor being supported solely by said two bearings, and distributor mechanism associated with said shaft on the other side of said gear and bearings.

5. In combination, an internal combustion engine, a cam shaft therefor, a second shaft, said second shaft being rotatably mounted, a driven member fixed to said second shaft, a driving member fixed to said cam shaft, means joining said members whereby they will be caused to rotate in unison, two plates spaced to form a housing for said driven member, a magneto rotor carried by said second shaft on one side of said housing, and distributor mechanism associated with said second shaft on the other side of said housing.

6. In combination, an internal combustion engine, a cam shaft therefor, a second shaft rotatably mounted substantially parallel to said cam shaft, a driven member fixed to said second shaft, a driving member fixed to said cam shaft, means joining said members whereby rotation of said cam shaft will be communicated to said second shaft, a pair of bearings forming the sole bearing support for said second shaft, a magneto rotor carried by said second shaft on one side of said pair of bearings, and interrupter and distributor mechanism associated with said second shaft on the other side of said pair of bearings.

7. In combination, an internal combustion engine, a cam shaft therefor, a second shaft substantially parallel to said cam shaft, a driven member fixed to said second shaft, bearings for said second shaft on opposite sides of said driven member and adjacent thereto, a driving member fixed to said cam shaft, means joining said members whereby rotation of said cam shaft will be communicated to said second shaft, a magneto rotor carried by said second shaft on one side of said driven member and bearings, said rotor being supported solely on said bearings, and distributor mechanism associated with said second shaft on the other side of said driven member and bearings.

8. In combination, an internal combustion engine, two plates spaced to form a gear housing, a shaft extending through said plates, bearings in said plates for said shaft, a gear on said shaft enclosed in said gear housing, means for driving said gear from said internal combustion engine, an inductor on said shaft to one side of said gear housing and interrupter mechanism on said shaft on the other side of said gear housing.

9. In combination, an internal combustion engine, a cam shaft therefor, a gear fixed to said cam shaft, two spaced bearing plates, bearings in said plates, a second shaft extending through said bearings, said second shaft being supported entirely by the said two bearings with the free ends of said shaft projecting from each side of said bearing plates, a gear mounted on said second shaft between said two bearing plates and adapted to be driven from said first named gear, a magneto rotor fixed to one of the free ends of said second shaft on one side of said pair of bearing plates, and distributor mechanism mounted on the other free end of said second shaft on the other side of said pair of bearing plates.

10. In combination, an internal combustion engine, a cam shaft therefor, a gear fixed to said cam shaft, a second shaft arranged substantially parallel to said cam shaft, a gear fixed to said second shaft, bearings for said second shaft on opposite sides of its gear, said second shaft being supported entirely by said two bearings with the free ends thereof projecting to each side of said bearings, an idler gear having its teeth in mesh with the teeth of the two first mentioned gears, said gears being so proportioned that said shafts will rotate in unison, a rotor fixed to the free end of said second shaft on one side of its gear, and distributor mechanism aligned with the free end of said second shaft on the opposite side of its gear.

11. In combination, an internal combustion engine, a cam shaft therefor, a second shaft, bearings for said second shaft, a supporting frame for said bearings, a gear fixed to said cam shaft, a gear fixed to said second shaft, an idler gear joining said two first mentioned gears, a magneto rotor carried by said second shaft on one side of its gear, distributor mechanism carried by said rotor on the opposite side of its gear, and detachable means securing said supporting frame to the engine frame, said second shaft gear and said idler gear being arranged so that the teeth thereof may be readily engaged and disengaged upon attaching said supporting frame to and detaching it from the engine frame.

12. In combination an internal combustion engine, a cam shaft therefor, a cover plate secured to the frame of said engine at the end of said cam shaft, a second shaft arranged substantially parallel to said cam shaft, bearings for said second shaft, a supporting frame for said bearings, means detachably securing said supporting frame to said cover plate, a driving member fixed to said cam shaft, a driven member fixed to said second shaft, means within said cover plate for joining said driving member to said driven member whereby said shafts will rotate in unison, a magneto rotor fixed to said second shaft, at one side of its gear, and distributor mechanism associated with said second shaft on the other side of its gear.

13. In combination, an internal combustion engine, a cam shaft therefor, a cover plate fixed to the frame of said engine adjacent to the forward end of said cam shaft, a second shaft, a gear fixed to said second shaft, bearings for said second shaft on opposite sides of said gear and adjacent thereto, a supporting frame for said bearings, means for detachably joining said supporting frame to said cover plate, a gear fixed to said cam shaft, an idler gear carried by said cover plate joining said two first mentioned gears, a magneto rotor carried by said second shaft on one side of its gear and bearings, and distributor mechanism associated with said second shaft on the other side of its gear and bearings, said parts being so arranged that said second shaft with its gear, bearings, rotor and distributor mechanism may be freely removed from said idler gear and cover plate upon disconnecting said supporting frame from said cover plate.

In witness whereof, I hereunto subscribe my name this 2nd day of February, 1924.

AUGUSTE V. PELLET.